(12) United States Patent
Bindra et al.

(10) Patent No.: US 10,387,908 B2
(45) Date of Patent: Aug. 20, 2019

(54) MANAGEMENT OF AN ADVERTISING EXCHANGE USING EMAIL DATA

(71) Applicant: Zeta Global Corp., New York, NY (US)

(72) Inventors: Dex Bindra, Jersey City, NJ (US); Jeffrey S. Nimeroff, Medford, NJ (US); Thomas Walsh, Brooklyn, NY (US)

(73) Assignee: Zeta Global Corp., New York, NY (US)

( * ) Notice: Subject to any disclaimer, the term of this patent is extended or adjusted under 35 U.S.C. 154(b) by 471 days.

(21) Appl. No.: 14/800,585

(22) Filed: Jul. 15, 2015

(65) Prior Publication Data

US 2016/0019584 A1  Jan. 21, 2016

Related U.S. Application Data

(60) Provisional application No. 62/025,158, filed on Jul. 16, 2014, provisional application No. 62/025,162, filed on Jul. 16, 2014.

(51) Int. Cl.
*G06Q 30/00* (2012.01)
*G06Q 30/02* (2012.01)

(52) U.S. Cl.
CPC ..... *G06Q 30/0244* (2013.01); *G06Q 30/0251* (2013.01)

(58) Field of Classification Search
CPC .............. G06Q 30/0244; G06Q 30/0251
See application file for complete search history.

(56) References Cited

U.S. PATENT DOCUMENTS

| | | | |
|---|---|---|---|
| 6,338,066 B1 | 1/2002 | Martin et al. | |
| 8,712,985 B1 * | 4/2014 | Tunguz-Zawislak | ................. G06Q 50/01 707/705 |
| 2002/0016818 A1 * | 2/2002 | Kirani | .............. G06F 17/30902 709/203 |
| 2003/0176931 A1 | 9/2003 | Pednault et al. | |
| 2003/0225609 A1 | 12/2003 | Klipfell, III | |
| 2004/0123314 A1 | 6/2004 | Bova | |
| 2004/0215509 A1 * | 10/2004 | Perry | ..................... G06Q 30/02 705/14.55 |
| 2005/0240512 A1 * | 10/2005 | Quintero | ............ G06Q 30/0603 705/37 |

(Continued)

OTHER PUBLICATIONS

"U.S. Appl. No. 14/800,582, Non Final Office Action dated Nov. 27, 2017", 25 pgs.

(Continued)

*Primary Examiner* — Bennett M Sigmond
*Assistant Examiner* — Scott C Anderson
(74) *Attorney, Agent, or Firm* — Schwegman Lundberg & Woessner, P.A.

(57) ABSTRACT

Systems and methods for management of an advertising exchange using email data are described. Systems and methods may include receiving one or more inputs of audience data from one or more publishers; transforming the one or more inputs into information in a unified customer database; receiving a query from a front end query tool; accessing information in the unified customer database responsive to the query; and providing the responsive information to the front end query tool.

14 Claims, 4 Drawing Sheets

(56) References Cited

U.S. PATENT DOCUMENTS

| | | |
|---|---|---|
| 2008/0005312 A1* | 1/2008 | Boss .................. H04L 51/12 709/224 |
| 2008/0065476 A1 | 3/2008 | Klein et al. |
| 2009/0234710 A1 | 9/2009 | Belgaied Hassine et al. |
| 2009/0281973 A1 | 11/2009 | Selinger et al. |
| 2009/0282343 A1 | 11/2009 | Catlin et al. |
| 2010/0312840 A1 | 12/2010 | Chestnut et al. |
| 2011/0078718 A1* | 3/2011 | Jakobi .................. G06Q 10/00 725/14 |
| 2012/0035943 A1* | 2/2012 | Araghi .................. G06Q 30/06 705/1.1 |
| 2012/0042025 A1 | 2/2012 | Jamison et al. |
| 2012/0143981 A1* | 6/2012 | Ku .................. H04L 67/12 709/217 |
| 2012/0158485 A1 | 6/2012 | Ogawa |
| 2012/0265567 A1* | 10/2012 | Muszynski ............ G06Q 10/10 705/7.11 |
| 2014/0278198 A1 | 9/2014 | Lyon et al. |
| 2015/0039432 A1* | 2/2015 | Rao .................. G06Q 30/0273 705/14.54 |
| 2015/0248694 A1 | 9/2015 | Chandra |
| 2016/0019582 A1 | 1/2016 | Bindra et al. |

OTHER PUBLICATIONS

"U.S. Appl. No. 14/800,582, Examiner Interview Summary dated Feb. 16, 2018", 3 pgs.

"U.S. Appl. No. 14/800,582, Response filed Feb. 27, 2018 to Non Final Office Action dated Nov. 27, 2017", 13 pgs.

"U.S. Appl. No. 14/800,582, Final Office Action dated May 23, 2018", 31 pgs.

"U.S. Appl. No. 14/800,582, Response filed Jul. 27, 2018 to Final Office Action dated May 23, 2018", 10 pgs.

"U.S. Appl. No. 14/800,582, Non Final Office Action dated Nov. 16, 2018", 32 pgs.

"U.S. Appl. No. 14/800,582, Response filed Jan. 21, 2019 to Non Final Office Action dated Nov. 16, 2018", 18 pgs.

"U.S. Appl. No. 14/800,582, Final Office Action dated Mar. 25, 2019", 12 pgs.

* cited by examiner

MANAGEMENT OF AN ADVERTISING EXCHANGE USING EMAIL DATA

INCORPORATION BY REFERENCE TO RELATED APPLICATIONS

This application claims benefit under 35 U.S.C. § 119(e) from U.S. Provisional Application No. 62/025,162, filed on Jul. 16, 2014 and U.S. Provisional Application No. 62/025,158, filed on Jul. 16, 2014. The disclosures of each of the applications cited in this paragraph are incorporated herein by reference in their entireties.

FIELD OF THE INVENTION

The present invention relates to systems and methods for management of an advertising exchange using email data, and, more specifically, to systems and methods for managing access and purchase of advertising inventory using email data.

BACKGROUND OF THE INVENTION

Targeted marketing is a commonly used tool for improving return on investment for advertising expenditures. In general, the more accurate the targeting is to consumers, the more benefit is received from the advertising campaign.

Currently, there are no existing systems that utilize email data to operate a publisher advertiser exchange. In existing systems, advertisers must work directly with sets of independent publishers. This requires negotiating multiple rates while conforming to multiple standards. Alternatively, the advertisers must work through an agency, which do not provide transparency or economies of scale.

Needs exist for improved systems and methods for improved systems and methods for marketing campaigns.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
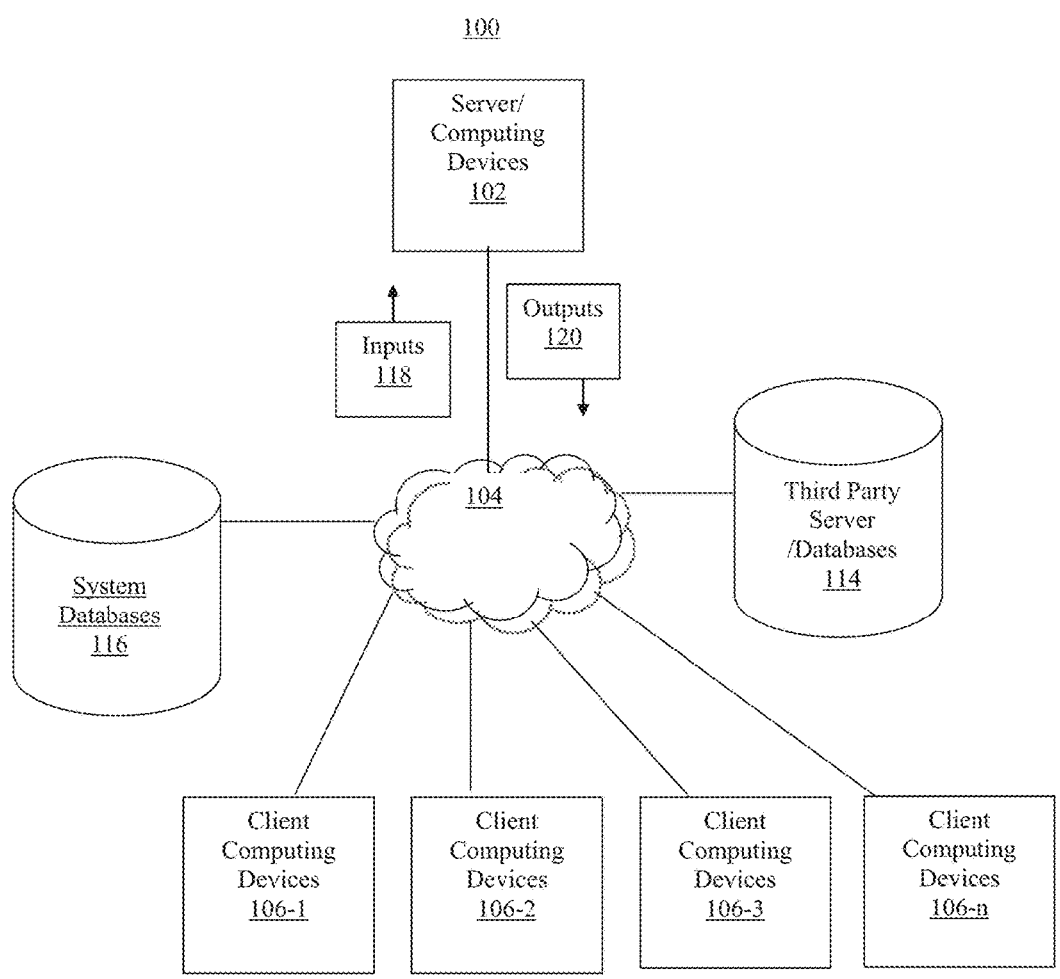
FIG. 1 shows an exemplary system for management of an advertising exchange using email data.

Systems and methods are described for using various tools and procedures for management of an advertising exchange using email data. In certain embodiments, the tools and procedures may be used in conjunction with improved performance of targeted advertising campaigns in the email channel. The examples described herein relate to email channels for illustrative purposes only. The systems and methods described herein may be used for many different channels, industries and purposes, including any type of marketing campaigns and/or other industries completely. In particular, the systems and methods may be used for any industry or purpose where targeted marketing is needed. For example, email data could be used to operate an exchange for SMS marketing or social media marketing. For multi-step processes or methods, steps may be performed by one or more different parties, servers, processors, etc.

Certain embodiments may provide systems and methods for targeted advertising. Systems and methods may aggregate email inventory from multiple publishers across demographic, psychographic, implicit, explicit, imputed, and computed attributes. The aggregated email inventory may be visible to advertisers. This may facilitate purchase of data for the purpose of targeting and sending third party dedicated emails.

Certain embodiments may allow advertisers to easily access and purchase email data enabling them to optimize yield across dedicated email audiences. In addition, publishers may be able to monetize inventory at a premium and more often than with existing system because the inventory is available to multiple advertisers and aggregated in a marketplace.

An email channel may be any communication sent electronically to an electronic address, i.e., sent via email. In certain embodiments, an email channel may refer to sending of third party advertisements through email.

In general, inventory may be a general term for a unit of advertising space, such as a magazine page, television airtime, direct mail message, email messages, text messages, telephone calls, etc. Advertising inventory may be advertisements a publisher has available to sell to an advertiser. In certain embodiments, advertising inventory may refer to a number of email advertisements being bought and/or sold. The terms inventory and advertising inventory may be used interchangeably. For email marketing campaigns, advertising inventory is typically an email message.

A publisher may be an entity that sells advertising inventory, such as those produced by the systems and methods herein, to their email subscriber database. An advertiser may be a buyer of publisher email inventory. Examples of advertisers may include various retailers. A marketplace may allow advertisers and publishers to buy and sell advertising inventory. Marketplaces, also called exchanges or networks, may be used to sell display, video, and mobile inventory. In certain embodiments, a marketplace may be an email exchange/email marketplace. An email exchange may be a type of marketplace that facilitates buying and/or selling of inventory between advertisers and publishers. This inventory may be characterized based on customer attributes used in marketing campaigns. Therefore, an email exchange may have inventory that can be queried by each advertiser. This may increase efficiency of advertisers when purchasing inventory. A private network may be a marketplace that has more control and requirements for participation by both advertisers and publishers.

An individual record/prospect may be at least one identifier of a target. In certain embodiments, the individual record/prospect may be identified by a record identification mechanism, such as a specific email address (individual or household) that receives an email message.

An audience may be a group of records, which may be purchased as inventory. In certain embodiments, an audience may be a group of records selected from publisher databases of available records. The subset of selected records may adhere to a predetermined set of criteria, such as common age range, common shopping habits, and/or similar lifestyle situation (i.e., stay at home mother). Advertisers generally select the predetermined set of criteria when they are making an inventory purchase.

Although not required, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java.NET Framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

FIG. 1 shows an exemplary system 100 for predictive modeling of offline attribution according to one embodiment. In this exemplary implementation, system 100 may include one or more servers/computing devices 102 (e.g., server 1, server 2, . . . , server n) operatively coupled over network 104 to one or more client computing devices 106-1 to 106-n, which may include one or more consumer computing devices, one or more provider computing devices, one or more remote access devices, etc. The one or more servers/computing devices 102 may also be operatively connected, such as over a network, to one or more third party servers/databases 114 (e.g., database 1, database 2, . . . , database n). The one or more servers/computing devices 102 may also be operatively connected, such as over a network, to one or more system databases 116 (e.g., database 1, database 2, . . . , database n). Various devices may be connected to the system, including, but not limited to, client computing devices, consumer computing devices, provider computing devices, remote access devices, etc. This system may receive inputs 118 and outputs 120 from the various computing devices, servers and databases.

Server/computing device 102 may represent, for example, any one or more of a server, a general-purpose computing device such as a server, a personal computer (PC), a laptop, a smart phone, a tablet, and/or so on. Networks 104 represent, for example, any combination of the Internet, local area network(s) such as an intranet, wide area network(s), cellular networks, WIFI networks, and/or so on. Such networking environments are commonplace in offices, enterprise-wide computer networks, etc. Client computing devices 106, which may include at least one processor, represent a set of arbitrary computing devices executing application(s) that respectively send data inputs to server/computing device 102 and/or receive data outputs from server/computing device 102. Such computing devices include, for example, one or more of desktop computers, laptops, mobile computing devices (e.g., tablets, smart phones, human wearable device), server computers, and/or so on. In this implementation, the input data comprises, for example, publisher data, audience data, email data, and/or so on, for processing with server/computing device 102. In one implementation, the data outputs include, for example, emails, templates, forms, and/or so on. Embodiments of the present invention may also be used for collaborative projects with multiple users logging in and performing various operations on a data project from various locations. Embodiments of the present invention may be web-based, smart phone-based and/or tablet-based or human wearable device based.

In this exemplary implementation, server/computing device 102 includes at least one processor coupled to a system memory. System memory may include computer program modules and program data.

Figure 2:
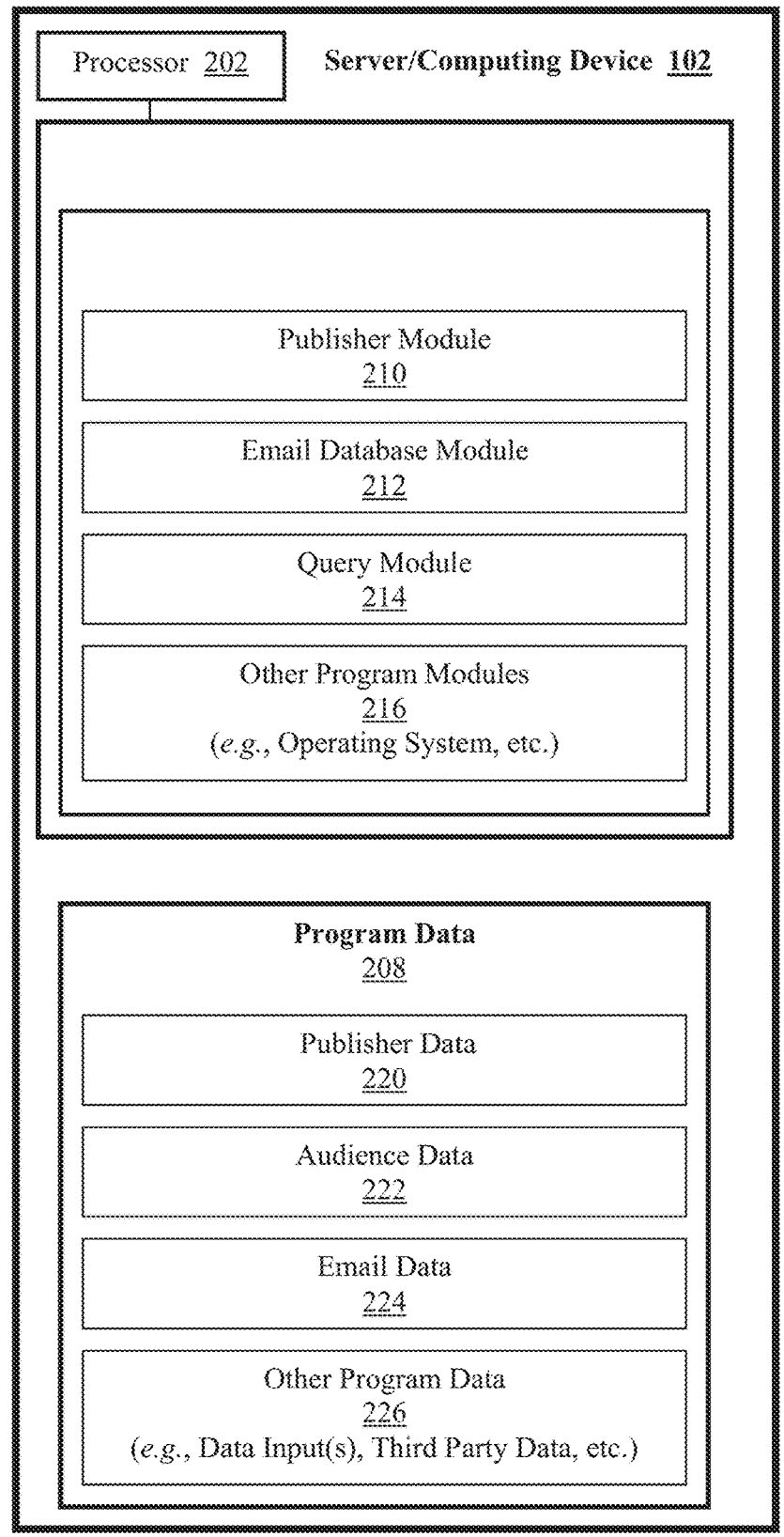
FIG. 2 shows an exemplary system for computational aspects of management of an advertising exchange using email data.

In this exemplary implementation, server/computing device 102 includes at least one processor 202 coupled to a system memory 204, as shown in FIG. 2. System memory 204 may include computer program modules 206 and program data 208. In this implementation program modules 206 may include publisher module 210, email database module 212, query module 214, and other program modules 216 such as an operating system, device drivers, etc. Each program module 210 through 216 may include a respective set of computer-program instructions executable by processor(s) 202. This is one example of a set of program modules and other numbers and arrangements of program modules are contemplated as a function of the particular arbitrary design and/or architecture of server/computing device 102 and/or system 100 (FIG. 1). Additionally, although shown on a single server/computing device 102, the operations associated with respective computer-program instructions in the program modules 206 could be distributed across multiple computing devices. Program data 208 may include publisher data 220, audience data 222, email data 224, and other program data 226 such as data input(s), third party data, and/or others.

Figure 3:
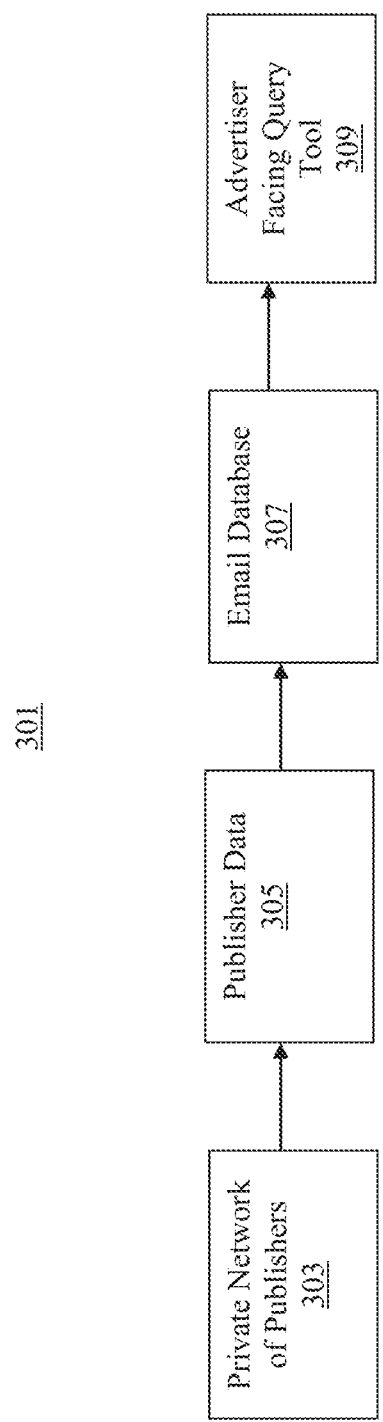
FIG. 3 shows an exemplary flow diagram for management of an advertising exchange using email data.

As shown in FIG. 3, certain embodiments may provide management of data in an email channel.

A system 301 may aggregate data from one or more publishers into a unified database. A network of publishers 303 may be provided and/or accessible. In certain embodiments, the network of publishers 303 may be a private network of publishers. Each of the publishers 305, such as Publisher A, may include audience data. The audience data for each publisher may be transformed and aligned into a unified email database 307. An advertiser facing query tool 309 may interact with the unified email database 307 to provide advertisers with requested information. Data may be accessed from and/or provided by one or more sources.

Figure 4:
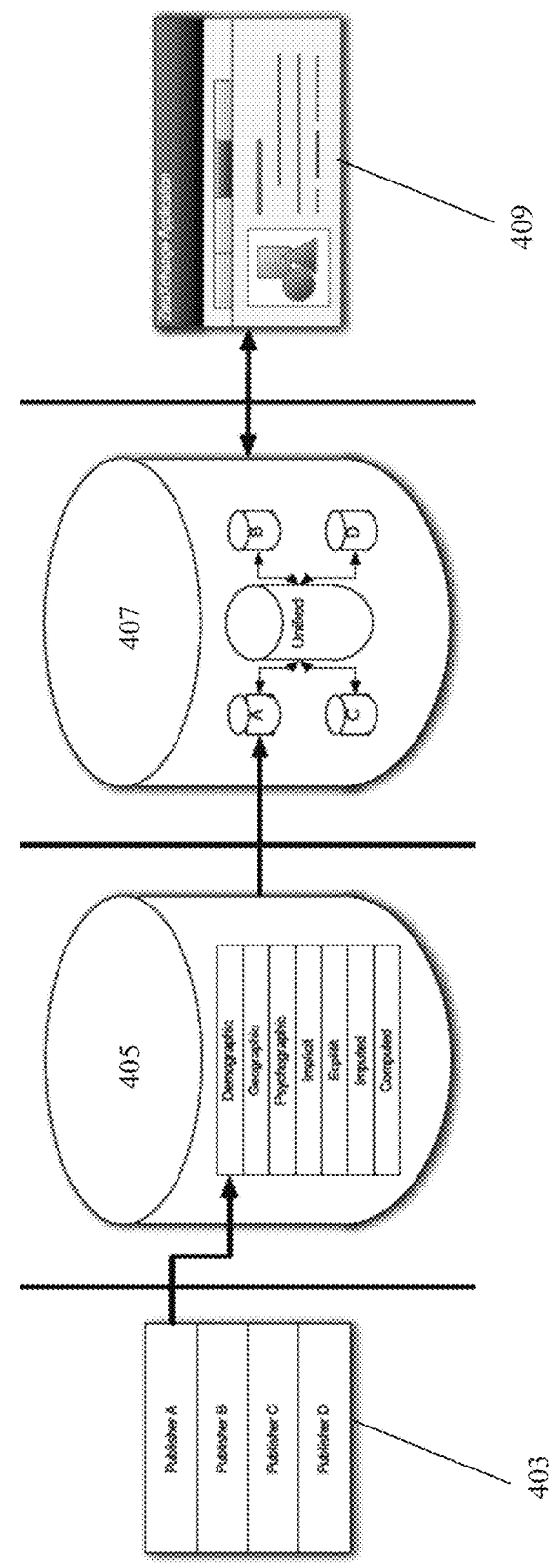
FIG. 4 shows an exemplary flow diagram for management of an advertising exchange using email data.

FIG. 4 shows a system for management of data in an email channel.

A system 401 may aggregate data from one or more publishers into a unified database. A network of publishers 403 may be provided and/or accessible. In certain embodiments, the network of publishers 403 may be a private network of publishers. Publishers A-D are shown in FIG. 4 for illustrative purposes, but it is understood that any number of publishers may be provided in the network of publishers 403. Private networks of publishers may be maintained for the purpose of fulfilling advertiser media buys.

Each of the publishers 405, such as Publisher A, may include audience data. Audience data may include individual and household level demographics from self-reported sources and third party vendors, digital shopping behavior across other marketing campaigns, and offline shopping behavior sourced from catalogues, loyalty cards, retail stores, etc. Audience data may include one or more of the following:

demographics (explicit information on the email record individual such as, but not limited to, age, gender, income, marital status, etc.);

geographic (explicit information on the email record such as, but not limited to, postal address, zip code, state, etc.);

psychographic (description of personality, values, opinions, attitudes, interests, lifestyles, etc. that allow advertisers to customize content to improve response);

implicit: Any third party data, not necessarily questionable as to its truth, but the audit trail is less strict/complete;

explicit: Data that is verified or observed, which may also include self-reported data;

imputed: Use of statistics to determine a value that is missing from a data set. This may be used as a placeholder until explicit information is received. For example, based on response history, a person's gender may be determined, but there may not be explicit or implicit data confirming the person's gender; and computed: Data, such as, but not limited to, response rate, which are based on observed/verified information. For example, the number of times an individual opens out of the number of times they receive an email. In certain embodiments, raw transactions that represent a purchase history may be used to compute a score such as RFM (recency, frequency, monetary), which would not typically be reported.

The audience data for each publisher may be transformed and aligned into a unified email database 407. Publishers may provide records with audience attributes. As such publishers may provide records with the same types of information, but not always all of the same type of information. Publisher records may be transformed into a common format with a set of cleaning and augmentation procedures applied, such as, but not limited to, filling in gaps, layering on new information, etc. Publishers can pass data in any format, which may be independent of the destination format. As such, the transforming may include normalizing the audience data, converting the audience data to a predetermined format, inputting missing values, appending additional information, cleansing, and manipulating the data for querying in a unified customer database. Each of the publisher records may be stored separately in the email database and/or may be merged into a single database.

An advertiser facing query tool 409 may interact with the unified email database 407 to provide advertisers with requested information. Data may be accessed from and/or provided by one or more sources. The front end query tool 409 may allow advertisers to count available email inventory across the publisher email database.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A computer-implemented method of management of an advertising exchange using email data, the computerized method comprising the steps of, by at least one processor:
   at a first system:
   providing an interactive user interface for controlling management of data in an email channel;
   presenting, in the interactive user interface, a first user interface element selectable to implement an online front end query tool;
   providing a destination portal for receipt of audience data transmitted by one or more publishers in a format independent of a destination format;
   receiving one or more inputs of online audience data from the one or more publishers, the audience data including email channel inventory from multiple publishers publishing content to audiences, the audience data having one or more attributes from a group of audience attributes including demographic, geographic, psychographic, implicit, explicit, imputed, and computed attributes, the audience data including records from each publisher that do not include the same type of information or format;
   transforming the one or more inputs into information in a unified customer database, the records being transformed into a common format;
   simultaneously presenting, in the interactive user interface, a second user interface element selectable to implement a predictive model of offline attribution relating to offline audience data and generated by a second system;
   implementing a predictive model of offline attribution relating to offline audience data and generated by a second system;
   the offline audience data including offline shopping behavior sourced from at least one or more offline sources including a catalog, a loyalty card, or a retail store;
   including in the unified customer database the online audience data and the offline audience data, the first and second use interface elements to present, in the same graphical user interface, online and offline audience data sourced from the unified customer database;
   receiving a query via the front end query tool, the front end query tool allowing an advertiser to count an available email inventory across the unified customer database;
   accessing information in the unified customer database responsive to the query; and
   providing the responsive information via the front end query tool.

2. The method of claim 1, wherein the one or more publishers is a network of multiple publishers.

3. The method of claim 1, wherein the transforming comprises normalizing the audience data, converting the audience data to a predetermined format, inputting missing values, appending additional information, cleansing, and manipulating the data for querying in a unified customer database.

4. The method of claim 1, wherein the unified customer database comprises a series of databases for each of the one or more publishers.

5. A computer-implemented method of management of an advertising exchange using email data, the computer-implemented method comprising the steps of:
   providing an interactive user interface for controlling management of data in an email channel;
   presenting, in the interactive user interface, a first user interface element selectable to implement an online front end query tool;
   providing a destination portal for receipt of audience data transmitted by one or more publishers in a format independent of a destination format;
   receiving one or more inputs of online audience data from the one or more publishers, the audience data including email channel inventory from multiple publishers publishing content to audiences, the audiences having one or more attributes from a group of audience attributes including demographic, geographic, psychographic, implicit, explicit, imputed, and computed attributes, the audience data including records from each publisher that do not include the same type of information or format;

transforming the one or more inputs into information in a unified customer database, the records being transformed into a common format;

simultaneously presenting, in the interactive user interface, a second user interface element selectable to implement a predictive model of offline attribution relating to offline audience data and generated by a second system;

implementing a predictive model of offline attribution relating to offline audience data and generated by a second system;

the offline audience data including offline shopping behavior sourced from at least one or more offline sources including a catalog, a loyalty card, or a retail store;

including in the unified customer database the online audience data and the offline audience data, the first and second use interface elements to present, in the same graphical user interface, online and offline audience data sourced from the unified customer database;

receiving a query via the front end query tool, the front end query tool allowing an advertiser to count an available email inventory across the unified customer database;

accessing information in the unified customer database responsive to the query; and providing the responsive information via the front end query tool.

6. The method of claim 5, wherein the one or more publishers is a network of multiple publishers.

7. The method of claim 5, wherein the transforming comprises normalizing the audience data, converting the audience data to a predetermined format, inputting missing values, appending additional information, cleansing, and manipulating the data for querying in a unified customer database.

8. The method of claim 5, wherein the unified customer database comprises a series of databases for each of the one or more publishers.

9. The method of claim 5, wherein the query is from the advertiser.

10. The method of claim 5, wherein the responsive information is a count of available email inventory.

11. A system for management of an advertising exchange using email data, the system comprising:
one or more databases comprising one or more inputs; and
one or more processors for:
providing an interactive user interface for controlling management of data in an email channel;
presenting, in the interactive user interface, a first user interface element selectable to implement an online front end query tool;
providing a destination portal for receipt of audience data transmitted by one or more publishers in a format independent of a destination format;
receiving one or more inputs of online audience data from the one or more publishers, the audience data including email channel inventory from multiple publishers publishing content to audiences, the audiences having one or more attributes from a group of audience attributes including demographic, geographic, psychographic, implicit, explicit, imputed, and computed attributes, the audience data including records from each publisher that do not include the same type of information or format;
transforming the one or more inputs into information in a unified customer database, the records being transformed into a common format;
simultaneously presenting, in the interactive user interface, a second user interface element selectable to implement a predictive model of offline attribution relating to offline audience data and generated by a second system;
implementing a predictive model of offline attribution relating to offline audience data and generated by a second system;
the offline audience data including offline shopping behavior sourced from at least one or more offline sources including a catalog, a loyalty card, or a retail store;
including in the unified customer database the online audience data and the offline audience data, the first and second use interface elements to present, in the same graphical user interface, online and offline audience data sourced from the unified customer database;
receiving a query via the front end query tool, the front end query tool allowing an advertiser to count an available email inventory across the unified customer database;
accessing information in the unified customer database responsive to the query; and
providing the responsive information via the front end query tool.

12. The system of claim 11, wherein the one or more publishers is a network of multiple publishers.

13. The system of claim 11, wherein the transforming comprises normalizing the audience data, converting the audience data to a predetermined format, inputting missing values, appending additional information, cleansing, and manipulating the data for querying in a unified customer database.

14. The system of claim 11, wherein the unified customer database comprises a series of databases for each of the one or more publishers.

* * * * *